Dec. 15, 1942.  O. RICE  2,304,850
PREVENTING THE PRECIPITATION OF IRON IN WATER
Filed April 10, 1941
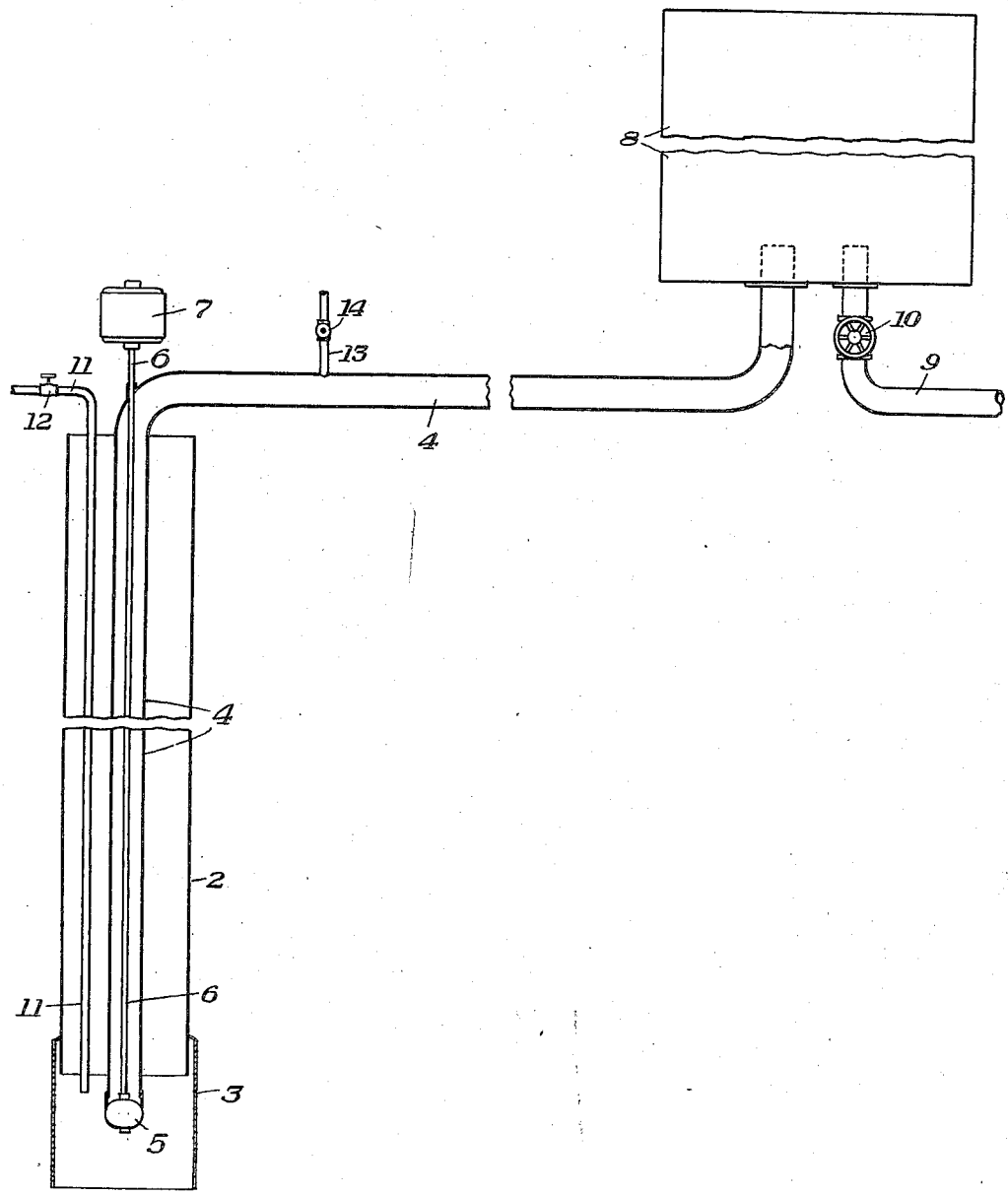
INVENTOR
Owen Rice Patented Dec. 15, 1942

2,304,850

UNITED STATES PATENT OFFICE 2,304,850

PREVENTING THE PRECIPITATION OF IRON IN WATER

Owen Rice, Pittsburgh, Pa., assignor to Hall Laboratories, Inc., Pittsburgh, Pa., a corporation of Pennsylvania Application April 10, 1941, Serial No. 387,986

11 Claims. (Cl. 210—23)

This invention relates to a process of preventing the precipitation of iron dissolved in water. It relates more particularly to preventing the precipitation of iron dissolved in water or the coloration of water containing iron by adding to the water a very small quantity of molecularly dehydrated alkali-metal phosphate before the water is exposed to air.

Municipal and industrial well water supplies frequently contain comparatively large amounts of iron in solution. Such supplies are generally relatively free of oxygen but upon reaching the surface of the well oxygen is absorbed and the iron is precipitated as ferric oxide which results in coloring the water and building up deposits of soft hydrated iron oxide in the inside of the pipes and condensers.

I have found that the coloration of water by iron or the precipitation of iron in water can be prevented by adding to the water before it is exposed to air, a small amount of molecularly dehydrated alkali-metal phosphate, for example the glassy molecularly dehydrated sodium phosphate commonly known as sodium hexametaphosphate or Graham's salt. The molecularly dehydrated alkali-metal phosphate is preferably added to the water in the well at a point adjacent the bottom of the well before the water is exposed to air. It may, however, be added at other places, provided the water containing the iron has not been exposed to air for such a period of time as would oxidize the iron from the ferrous to the ferric state.

The accompanying figure illustrates in a diagrammatic manner a preferred method of treating the water with the molecularly dehydrated alkali-metal phosphate.

The preferred molecularly dehydrated alkali-metal phosphate used in treating the water to prevent the precipitation of iron is the glassy molecularly dehydrated sodium phosphate commonly known as sodium hexametaphosphate or Graham's salt. For purposes of conciseness, the invention will be explained as applied to the use of sodium hexametaphosphate, it being understood that any of the other molecularly dehydrated alkali-metal phosphates may be used in place of or in addition to the sodium hexametaphosphate.

Referring to the accompanying drawing, the reference numeral 2 designates the casing of a well. The casing is provided with a screen 3 adjacent the bottom and inside of the casing is a discharge pipe 4. A pump 5 driven through a shaft 6 by a motor 7 discharges the well water through the pipe 4 to a storage tank 8. The water is withdrawn for use from the tank through a pipe 9 controlled by a valve 10. All of the above construction may be of any usual or desired type, as no claim is made to the actual construction of the well or pump mechanism. Sodium hexametaphosphate in small quantity is fed to the water in the well through a pipe 11 controlled by a valve 12. The lower end of the pipe 11 preferably extends to a point adjacent the bottom of the well so as to insure that the sodium hexametaphosphate will be supplied to the water before the water is exposed to air. It is practical, however, to add the metaphosphate to the water outside of the well at any point where the water has not been exposed to air or has not been treated with chlorine or other oxidizing agent. Thus I may add the metaphosphate to the water in the pipe 4 at a point between the top of the well and the storage tank 8, for example, by supplying the metaphosphate through a pipe 13 controlled by a valve 14. It is essential, however, that the metaphosphate be added to the water before the water enters the storage tank, if the storage tank is of the type in which the water is exposed to air.

I have found that in order to hold the iron in solution about one part per million of the glassy sodium hexametaphosphate is usually necessary for every part per million of iron present in the water. If less than this amount is used, precipitation of hydrated iron oxide is not completely prevented, and the material that does precipitate removes the metaphosphate from solution almost completely by adsorption, so that, once precipitation has started, it continues cumulatively. The use of one part per million of sodium hexametaphosphate for each part per million of iron will, in general, prevent precipitation for many hours or even several days, although the water may take on a yellow cast. Even this discoloration of the water may be prevented, if as much as four parts per million of sodium hexametaphosphate is used for each part per million of dissolved iron.

There is no objection to using more than four parts per million of metaphosphate for each part per million of dissolved iron, aside from the increased cost. Thus five parts per million or even ten parts per million for each part per million of dissolved iron might be employed. In general, however, it is unnecessarily wasteful to use more than from one to four parts per million of sodium hexametaphosphate for each part per million of dissolved iron.

An important feature of the present invention is the very small amount of sodium hexametaphosphate which is required in order to prevent the precipitation of iron. This amount is much less than would be required if the action depended upon the formation of a soluble complex of iron and sodium hexametaphosphate. In order to form a soluble complex of iron and sodium hexametaphosphate, there would be required about 20 parts of sodium hexametaphosphate for each part of iron, whereas according to the present invention only about 1 to 4 parts of sodium hexametaphosphate are required for each part of iron. The amount of sodium hexametaphosphate required for preventing the precipitation of iron is not dependent upon the hardness of the water but only upon the iron content. Thus about 1 to 4 parts of sodium hexametaphosphate for each part of iron is a suitable quantity, irrespective of the amount of calcium or magnesium present in the water. Sodium hexametaphosphate will form complexes with calcium and magnesium, as pointed out in Hall Reissue Patent 19,719, reissued October 8, 1935. The complexes of calcium and magnesium with sodium hexametaphosphate are more stable than the complex of iron and sodium hexametaphosphate. Accordingly if the present invention involved the use of sodium hexametaphosphate in such quantity as to form a complex with iron, it would be necessary to add a sufficient amount of sodium hexametaphosphate to sequester not only the iron but the calcium and magnesium. Since according to the present invention the amount of sodium hexametaphosphate required to prevent precipitation of iron is independent of the hardness of the water, it follows that this invention does not involve the use of sodium hexametaphosphate in a quantity sufficient to sequester the iron in a complex with the metaphosphate.

As previously stated, the preferred molecularly dehydrated alkali-metal phosphate is the glassy molecularly dehydrated sodium phosphate commonly known as sodium hexametaphosphate or Graham's salt. The sodium hexametaphosphate is a glassy material having a ratio of $Na_2O$ to $P_2O_5$ of 1:1. Other glassy molecularly dehydrated alkali-metal phosphates having different ratios of $Na_2O$ or other alkali-metal oxide to $P_2O_5$ may be employed. It will be understood that sodium hexametaphosphate is given as representative of the family or class of glassy molecularly dehydrated phosphates and that other glassy molecularly dehydrated sodium phosphates having a ratio of $Na_2O$ to $P_2O_5$ between 0.9:1.0 and 1.7:1.0, such as the so-called "sodium tetraphosphate $Na_4P_4O_{13}$" with a ratio of $Na_2O$ to $P_2O_5$ of 1.5:1.0, or the so-called "sodium decaphosphate $Na_{12}P_{10}O_{31}$" with a ratio of $Na_2O$ to $P_2O_5$ of 1.2:1.0, may be used in place of or in addition to the glassy sodium hexametaphosphate. All of these glassy molecularly dehydrated phosphates have properties which are similar to one another, although differing somewhat in their effectiveness, depending upon the ratio of $Na_2O$ to $P_2O_5$. I have made reference to the so-called "sodium tetraphosphate $Na_4P_4O_{13}$" and the so-called "sodium decaphosphate $Na_{12}P_{10}O_{31}$," because such phosphates have been referred to in the literature. It is believed, however, that neither the so-called "sodium tetraphosphate" nor the so-called "sodium decaphosphate" actually exist as chemical compounds. This is more fully pointed out in the article by Partridge et al. entitled "A Thermal, Microscopic and X-Ray Study of the System $NaPO_3$—$Na_4P_2O_7$," published in the February 1941 issue of "Transactions of the American Chemical Society." It is of course true that glassy phosphates having the nominal composition of $Na_6P_4O_{13}$ or $Na_{12}P_{10}O_{31}$ can be made but since the compositions are glasses, they do not represent any definite chemical compounds but merely mixtures of ingredients.

The present invention is intended to cover the use, for the purpose of preventing coloration of water or precipitation of iron, of any molecularly dehydrated alkali-metal phosphate by adding a very small amount of the molecularly dehydrated alkali-metal phosphate to the water before it is exposed to air. The term "molecularly dehydrated alkali-metal phosphate" is intended to include any and all of the glassy phosphates hereinbefore referred to, for example sodium hexametaphosphate, the crystalline tripolyphosphate or crystalline pyrophosphate, for example $Na_5P_3O_{10}$ or $Na_4P_2O_7$, or mixtures of any of these phosphates. All of these molecularly dehydrated phosphates may be considered as derived from orthophosphates by the elimination of water of constitution. The molecularly dehydrated phosphates contain less water of constitution than the corresponding orthophosphates and have, therefore, come to be recognized as molecularly dehydrated phosphates, as pointed out more fully in the Hall and Jackson Patent 1,903,041, granted March 28, 1933.

It is essential that the molecularly dehydrated alkali-metal phosphate be added to the water before oxidation of the dissolved iron in the water has occurred to a substantial extent. Thus the phosphate should be added before the water is exposed to the air in a storage tank, reservoir or sump and since oxygen is sometimes sucked into the water while it is being pumped from the well, it is preferable to add it through a drop line ending opposite the suction intake in the well itself. A convenient method of adding the phosphate is to dissolve it in water and add the required amount of solution to the water to be treated.

Although the molecularly dehydrated alkali-metal phosphates which have been referred to thus far are all freely water soluble, the present invention is not limited to the water soluble phosphates. Since only a very small amount of molecularly dehydrated phosphate is required according to the present invention, I may use those molecularly dehydrated phosphates which, whether in glassy or crystalline form, are only slowly soluble and which are sometimes referred to as "water-insoluble." Such slowly soluble phosphates are disclosed in the copending application of Everett P. Partridge, Serial No. 351,983, filed August 9, 1940. Among the slowly soluble molecularly dehydrated phosphates disclosed in said Partridge application are the following:

A. Glassy metaphosphates of the alkaline earth metals and of bivalent and trivalent metals in general, particular examples of bivalent and trivalent metals being calcium, magnesium, barium, aluminum, zinc, copper and lead.

B. Crystalline sodium metaphosphate (Maddrell salt) and crystalline potassium metaphosphate.

C. Mixed phosphate glass containing molecularly dehydrated sodium or potassium phosphate glass and molecularly dehydrated phosphate of the bivalent or trivalent metals above mentioned, for example mixed sodium-calcium metaphosphate glass or mixed sodium-calcium phosphate glass or sodium-magnesium phosphate glass having a ratio of $Na_2O$ to $CaO$ or $MgO$ which differs from the ratio in the metaphosphate, for instance, a phosphate glass with the empirical formula $Na_2Mg_2P_4O_{13}$ or $Na_2O.2MgO.2P_2O_5$, which might be called sodium magnesium tetraphosphate.

D. Molecularly dehydrated phosphate glasses in which the ratio of metal oxide to $P_2O_5$ is less than that in metaphosphate, for example $Na_{10}P_{12}O_{35}$, which might be described as $10NaPO_3.P_2O_5$ or $5Na_2O.6P_2O_5$.

As pointed out in said Partridge application, the rate of solution of the molecularly dehydrated phosphate glasses varies with their relative content of the monovalent alkali-metal oxides, such as $Na_2O$ and $K_2O$, on the one hand, and the oxides of the bivalent and trivalent metals, such as $CaO$, $MgO$, $BaO$, $Al_2O_3$, $ZnO$, $CuO$ or $PbO$, on the other hand. Thus the sodium phosphate, potassium phosphate and mixed sodium-potassium phosphate glasses all have very high rates of solution, the phosphate glasses of the bivalent and trivalent metals all have very low rates of solution, and mixed glasses of the monovalent metals and the bivalent or trivalent metals have intermediate rates of solution.

Specific examples of slowly soluble molecularly dehydrated phosphates mentioned in said Partridge application are as follows:

| Composition—Mol Per Cent | State |
|---|---|
| 45.9 $Na_2O$, 45.9 $P_2O_5$, 8.2 $SiO_2$ | Glass |
| 45 $Na_2O$, 55 $P_2O_5$ | Do. |
| $KPO_3$ | Crystal |
| 28.6 $Na_2O$, 28.6 $CaO$, 42.8 $P_2O_5$ | Glass |
| 42.5 $Na_2O$, 15 [⅓ $Al_2O_3$] 42.5 $P_2O_5$ | Do. |
| 20 $K_2O$, 20 $ZnO$, 60 $P_2O_5$ | Do. |
| 16.7 $Na_2O$, 33.3 $CaO$, 50 $P_2O_5$ | Do. |
| $NaPO_3$ (Maddrell salt) | Crystal |
| 50 $BaO$, 50 $P_2O_5$ | Glass |
| 40 $Na_2O$, 60 $P_2O_5$ | Do. |
| 50 $CaO$, 50 $P_2O_5$ | Do. |
| 45 $CaO$, 55 $P_2O_5$ | Do. |
| 20 $Na_2O$, 40 $MgO$, 40 $P_2O_5$ | Do. |

Although I have described the preferred method of carrying out the process, it is to be understood that the invention is not limited thereto but may be otherwise embodied or practiced within the scope of the following claims.

I claim:

1. A process of preventing precipitation of dissolved iron in well water, which comprises adding to the water in the well before it is exposed to air, molecularly dehydrated alkali-metal phosphate in amount of about 1 to 10 parts by weight per part of iron.

2. A process of preventing precipitation of dissolved iron in well water, which comprises adding to the water in the well before it is exposed to air, about 1 to 4 parts by weight per part of iron, of glassy molecularly dehydrated sodium phosphate having a ratio of $Na_2O$ to $P_2O_5$ between 0.9:1 and 1.7:1.

3. A process of preventing precipitation of dissolved iron in well water, which comprises adding to the water in the well before it is exposed to air, about 1 to 10 parts by weight per part of iron, of sodium pyrophosphate.

4. A process of preventing precipitation of dissolved iron in well water, which comprises adding to the water in the well before it is exposed to air, about 1 to 10 parts by weight per part of iron, of crystalline sodium tripolyphosphate.

5. A process of preventing precipitation of dissolved iron in well water, which comprises adding to the water as coming from the well and before exposure to air and before it is treated with chlorine or other oxidizing agent, molecularly dehydrated alkali-metal phosphate in amount of about 1 to 10 parts by weight per part of iron.

6. A process of preventing precipitation of dissolved iron in well water, which comprises adding to the water as coming from the well and before exposure to air, molecularly dehydrated alkali-metal phosphate in amount of about 1 to 10 parts by weight per part of iron.

7. A process of preventing precipitation of dissolved iron in well water, which comprises adding to the water in the well before it is exposed to air, molecularly dehydrated phosphate in amount of about 1 to 10 parts by weight per part of iron.

8. A process of preventing precipitation of dissolved iron in well water, which comprises adding to the water as coming from the well and before exposure to air, molecularly dehydrated phosphate in amount of about 1 to 10 parts by weight per part of iron.

9. A process of preventing precipitation of dissolved iron in well water, which comprises adding to the water in the well before it is exposed to air, glassy molecularly dehydrated alkaline earth metal phosphate in amount of about 1 to 10 parts by weight per part of iron.

10. A process of preventing precipitation of dissolved iron in well water, which comprises adding to the water in the well before it is exposed to air, molecularly dehydrated phosphate in amount of about 1 to 10 parts by weight per part of iron, said phosphate being a mixture of at least one alkali-metal phosphate and at least one alkaline earth metal phosphate.

11. A process of preventing precipitation of dissolved iron in well water, which comprises adding to the water in the well before it is exposed to air, molecularly dehydrated phosphate in amount of about 1 to 10 parts by weight per part of iron, said phosphate being a mixture of sodium molecularly dehydrated phosphate and a molecularly dehydrated phosphate of a metal of the group consisting of calcium and magnesium.

OWEN RICE.